W. C. LAMONT.
TOWING DEVICE.
APPLICATION FILED MAR. 23, 191 .
1,291,029.
Patented Jan. 14, 1919.
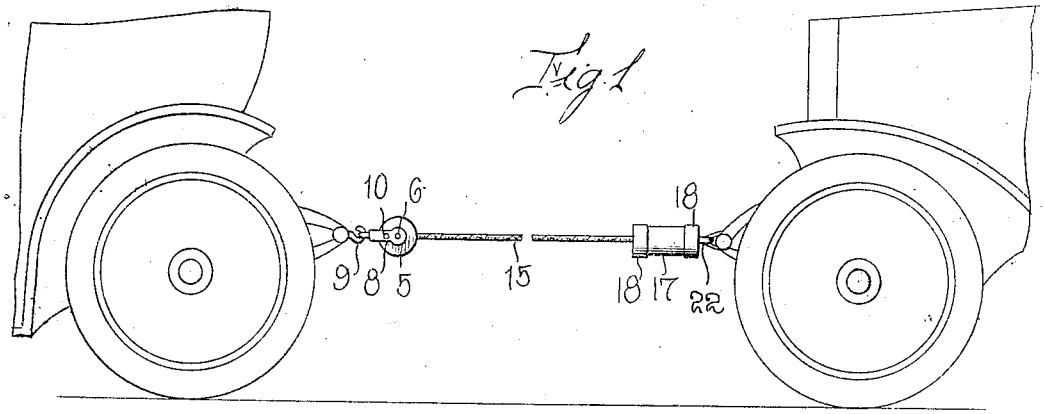
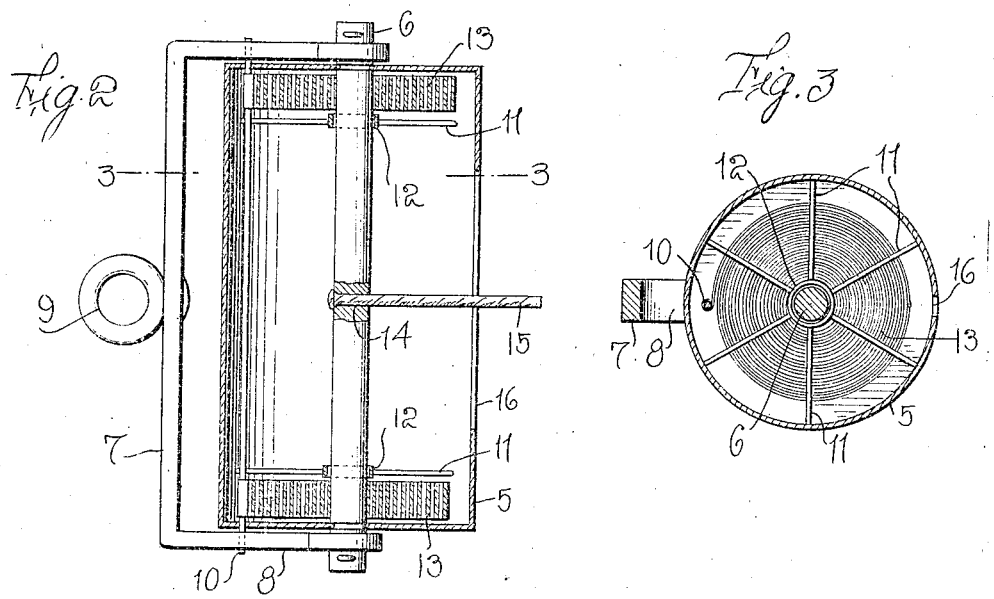
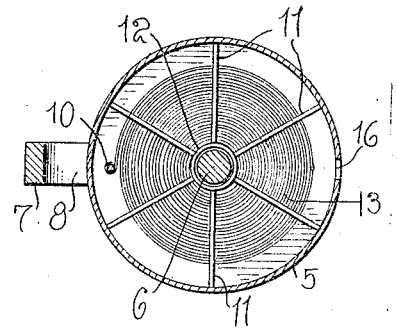
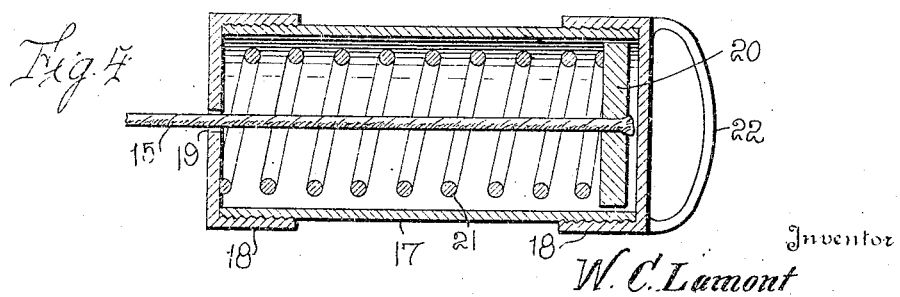
Inventor
W. C. Lamont
By Watson E. Coleman
Attorney

UNITED STATES PATENT OFFICE.

WILLIAM C. LAMONT, OF ONEONTA, NEW YORK.

TOWING DEVICE.

1,291,029. Specification of Letters Patent. Patented Jan. 14, 1919.

Application filed March 23, 1918. Serial No. 224,332.

*To all whom it may concern:*

Be it known that I, WILLIAM C. LAMONT, a citizen of the United States, residing at Oneonta, in the county of Otsego and State of New York, have invented certain new and useful Improvements in Towing Devices, of which the following is a specification, reference being had to the accompanying drawings.

This invention relates to an improved towing device and has for its primary object to provide simple, durable and serviceable means whereby one motor vehicle or railway car may be pulled or towed by another.

It is a more particular object of the invention to provide a device for the above purpose embodying a casing or housing and means for attaching the same to the operative vehicle, a towing cable, and means within the casing for normally retaining the cable therein, and yieldable means on the free end of the cable for attaching the same to the vehicle to be towed.

It is also a general object of my invention to provide a device of the above character which may be carried as a part of the motor vehicle equipment, and by the use of which the possible wrecking of the vehicle being towed and injury to the occupant thereof when the towing vehicle slackens speed or comes to a sudden stop or start, is obviated.

With the above and other objects in view, the invention consists in the improved combination, construction and relative arrangement of the several parts as will be hereinafter more fully described, subsequently claimed and illustrated in the accompanying drawing in which similar reference characters designate the corresponding parts throughout the several views, and wherein:

Figure 1 is a side elevation illustrating the application and use of my improved towing device;

Fig. 2 is an enlarged longitudinal section through the housing or casing for the towing cable;

Fig. 3 is a section taken on the line 3—3 of Fig. 2; and

Fig. 4 is a longitudinal section through the yieldable attaching device at the free end of the cable.

Referring in detail to the drawing, 5 designates a cable housing or casing preferably of cylindrical form and constructed of sheet metal. The opposite end walls of this housing are centrally provided with openings through which the ends of the shaft 6 extend. The shaft ends are journaled in the arms 8 of the yoke 7, said yoke being provided at its center with an eye or ring 9 for connection to a hook or other attaching element fixed to the frame of the vehicle.

The housing 5 is held against rotation with the shaft 6 by means of a rod 10 extending longitudinally through the housing adjacent its body wall, the ends of said rod projecting beyond the opposite ends of the housing and being fixed in the arms 8 of the yoke 7. Within the housing 5 and in spaced relation to each end thereof, a plurality of radially disposed rods 11 are fixed at their outer ends to the housing walls. The inner ends of each series of rods 11 are rigidly connected to each other by means of a ring or annulus 12 which loosely surrounds the shaft 6. Between each series of rods 11 and the adjacent end wall of the housing 5 a spiral spring 13 is located, one end of said spring being securely fixed to the shaft 6 while the other end of the spring is fixed to the rod 10.

The shaft 6 is centrally provided with a transverse opening 14 through which one end of the towing cable 15 is extended and secured to said shaft. This cable is movable through an elongated slot or opening 16 in the body wall of the housing 5. The two series of radial rods 11, afford a protection for the springs 13 and effectually prevent any possibility of the cable contacting with said springs as it is wound upon the shaft 6.

The other or free end of the cable 15 is equipped with means for yieldably connecting said cable to the vehicle to be towed. This means as herein shown includes a cylindrical casing 17 upon each end of which a cap 18 is threaded. One of these caps is provided with a central opening 19 through which the cable end extends and a metal disk 20 is fixed to the extremity of the cable and is freely movable within the casing 17. One end of a coil spring 21 is secured to one face of the disk 20, the other end of said spring bearing against the cap 18 on the inner end of the casing 17. The other of the caps 18 is provided with a curved rod or bail 22 for connection to an attaching part on the vehicle to be towed.

From the above description, the operation of the device will be readily understood. The towing device which constitutes a part of the emergency equipment of the vehicle, is used in the event of a breakdown, whereby the vehicle can be easily and quickly coupled or connected to another operative vehicle with the proper distance or space between the two vehicles as required by law. The yoke 7 in which the housing 5 and the shaft 6 are mounted is first attached to the frame of the operative vehicle at its rear end, and the cable 15 is then withdrawn through the slot 16 and unwound from the shaft 6. In the rotation of said shaft, the spiral springs 16 are of course closely coiled or wound and placed under tension. The free end of the cable is attached to the vehicle to be towed at the forward end of its frame as above stated and the springs 13 and 21 will effectively act to at all times maintain the cable taut and progressively take up the slack therein when the towed vehicle through its momentum or when on a grade travels at a greater speed than the towing vehicle. In such event, the springs 13 tending to uncoil, rotate the shaft 6 so that the cable 15 will be wound thereon. When the towing vehicle suddenly starts, the spring 21 will take up the shock or jar which would otherwise be transmitted through the cable to the inoperative vehicle being towed, and obviates the possibility of overturning the latter vehicle and injuring the occupant thereof.

While my invention as above described is particularly designed as an emergency accessory for motor vehicles, it is apparent that it can also be employed for towing railway cars, barges, and for various other analogous purposes. When not in use, the cable is completely wound up and inclosed within the housing 5, and the entire device can then be packed or stored away in the body of the vehicle in a relatively small space. The several parts of the device, are very strong and durable in construction and will withstand severe strains. In view of the simplicity of these parts it will also be appreciated that the device can be manufactured at comparatively small cost.

While I have shown and described the preferred construction and relative arrangement of the several elements, it is to be understood that the device is susceptible of considerable modification therein and I, therefore, reserve the privilege of adopting all such changes as may be fairly embodied within the spirit and scope of the invention as claimed.

Having thus described my invention, what I claim is:—

1. A towing device including an attaching yoke, a housing, a shaft journaled in the arms of the yoke and extending through said housing, a cable attached at one of its ends to the shaft to be wound thereon and extending through an opening in the housing wall, a winding spring arranged within each end of the housing and fixed at one of its ends to said shaft, and a common means to secure the other ends of said springs and the housing against movement relative to the yoke.

2. A towing device including an attaching yoke, a housing, a shaft journaled in the arms of the yoke and extending through said housing, a rod extending through the housing and fixed in the arms of the yoke to prevent rotation of the housing with said shaft, a cable attached at one of its ends to said shaft to be wound thereon and extending through an opening in the housing wall, a winding spring within the housing fixed at one of its ends to said shaft and at its other end to said rod, and a plurality of radially extending guard rods fixed at their outer ends to the housing wall to prevent contact of the cable with said winding spring.

3. A towing device including an attaching yoke, a housing, a shaft journaled in the arms of the yoke and extending through said housing, a rod extending through the housing and fixed in the arms of the yoke to prevent rotation of the housing with said shaft, a cable attached at one of its ends to said shaft to be wound thereon and extending through an opening in the housing wall, a radially disposed series of guard rods within the housing and in spaced relation to each of its ends, the outer ends of said rods being fixed to the housing wall, an annulus connecting the rods at their inner ends and loosely surrounding the shaft, and a winding spring arranged between each series of guard rods and the adjacent end wall of the housing and fixed at one of its ends to said shaft and at its other end to the first named rod.

In testimony whereof I hereunto affix my signature in the presence of two witnesses.

WM. C. LAMONT.

Witnesses:
 GERTRUDE N. SANDELL,
 GEO. L. BOCKES.